United States Patent
Fei et al.

(10) Patent No.: US 9,046,936 B2
(45) Date of Patent: *Jun. 2, 2015

(54) INFORMATION INPUT APPARATUS AND METHOD FOR CONTROLLING INFORMATION INPUT APPARATUS

(71) Applicant: Panasonic Corporation, Kadoma-shi, Osaka (JP)

(72) Inventors: Yue Fei, San Jose, CA (US); Philippe Morin, Goleta, CA (US); David Kryze, Campbell, CA (US); Masaki Yamauchi, Osaka (JP); Yoshihiro Kojima, Hyogo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/124,267
(22) PCT Filed: Oct. 4, 2012
(86) PCT No.: PCT/US2012/058694
§ 371 (c)(1),
(2) Date: Dec. 6, 2013
(87) PCT Pub. No.: WO2013/055571
PCT Pub. Date: Apr. 18, 2013

(65) Prior Publication Data
US 2014/0118254 A1 May 1, 2014

Related U.S. Application Data

(63) Continuation of application No. 13/272,776, filed on Oct. 13, 2011, now Pat. No. 8,743,055.

(51) Int. Cl.
*G09G 5/00* (2006.01)
*G06F 3/033* (2013.01)
(Continued)

(52) U.S. Cl.
CPC ............... *G06F 3/033* (2013.01); *G06F 3/038* (2013.01); *G06F 3/04883* (2013.01); *G06F 3/0346* (2013.01)

(58) Field of Classification Search
CPC ..... G06F 3/033; G06F 3/0346; G06F 3/04883; G06F 3/038
USPC .................................................. 345/156–179
See application file for complete search history.

(56) References Cited

U.S. PATENT DOCUMENTS 5,666,499 A 9/1997 Baudel et al.
5,673,066 A 9/1997 Toda et al.
(Continued)

OTHER PUBLICATIONS

Xiang Cao, et al., "Comparing User Performance with Single-Finger, Whole-Hand, and Hybrid Pointing Devices", CHI 2010, Apr. 10-15, 2010, Atlanta, GA, USA.
(Continued)

*Primary Examiner* — Premal Patel
(74) *Attorney, Agent, or Firm* — Harness, Dickey & Pierce, P.L.C.

(57) ABSTRACT

The handheld controller controls a graphic cursor on a display. A motion sensor responds to user movement of a first type producing motion data. A touchpad responds to user movement of a second type more precise than the first type producing second sensor data. A processor calculates a hybrid cursor movement signal having a large scale movement component corresponding to movement of the first type and a fine scale movement component corresponding to movement of the second type, the hybrid cursor movement signal being for moving the graphic cursor. A processor calculates the large scale movement component based on a first sensitivity parameter representing sensitivity of the motion sensor determined by associating the touchpad data with the motion data, and the fine scale movement component based on a second sensitivity parameter representing sensitivity of the touchpad determined by associating the motion data with the touchpad data.

12 Claims, 15 Drawing Sheets

(51) Int. Cl.
*G06F 3/038* (2013.01)
*G06F 3/0488* (2013.01)
*G06F 3/0346* (2013.01)

(56) References Cited

U.S. PATENT DOCUMENTS

| | | |
|---|---|---|
| 7,696,980 B1 | 4/2010 | Piot et al. |
| 7,839,385 B2 | 11/2010 | Hunleth et al. |
| 2003/0080990 A1 | 5/2003 | Lyness |
| 2003/0210286 A1 | 11/2003 | Gerpheide et al. |
| 2004/0017355 A1 | 1/2004 | Shim |
| 2006/0267934 A1 | 11/2006 | Harley et al. |
| 2007/0188458 A1 | 8/2007 | Bells et al. |
| 2009/0153500 A1 | 6/2009 | Cho et al. |
| 2010/0039394 A1 | 2/2010 | Moussavi |
| 2010/0253619 A1 | 10/2010 | Ahn |
| 2010/0315336 A1 | 12/2010 | Butler et al. |

OTHER PUBLICATIONS

Daniel Vogel, et al., "Distant Freehand Pointing and Clicking on Very Large, High Resolution Displays", UIST '05, Oct. 23-27, 2005, Seattle, Washington, USA.
International Search Report and Written Opinion for PCT/US2012/058694, mailed Dec. 10, 2012; ISA/US.
International Preliminary Report on Patentability for PCT/US2012/058694, completed May 24, 2013; IPEA/US.

INFORMATION INPUT APPARATUS AND METHOD FOR CONTROLLING INFORMATION INPUT APPARATUS

CROSS-REFERENCE TO RELATED APPLICATIONS

This application is a 371 U.S. National Stage of International Application No. PCT/US2012/058694, filed Oct. 4, 2012, and claims priority to U.S. patent application Ser. No. 13/272,776, filed Oct. 13, 2011, the disclosures of which are herein incorporated by reference in their entirety.

TECHNICAL FIELD

The present disclosure relates generally to information input apparatuses and methods for controlling the apparatuses, and particularly to computer and consumer product user interface pointing systems and method for controlling the systems. More particularly, the disclosure relates to a pointing apparatus and method that responds to multiple input sources simultaneously and collaboratively to control the position and appearance of a cursor or pointer on an electronic display.

BACKGROUND ART

Pointing is a fundamental operation found in most graphical user interface (GUI) systems used by computers and many consumer electronics products. Typically, the user will manipulate a controller, such as a mouse, which in turn moves a computer-generated cursor on a display. The user will then move the cursor to select items of interest, navigate through many screens, explore content and the like. While use of a mouse is typical, some applications prefer gestural control where the user performs pointing using multiple body parts simultaneously and collaboratively, such as moving elbow, hand and finger to reach an object. For example, there is a remote pointing method in which the user may make an in-the-air gesture with the controller by holding a remote input device, and the gesture is translated into cursor movement on the display screen (for example see the Patent Literature 1).

CITATION LIST

Patent Literature

[Patent Literature 1] U.S. Pat. No. 7,696,980

SUMMARY OF INVENTION

Technical Problem

Current remote pointing methods suffer from the conflicting constraints of having limited range and having limited precision. A remote pointing device that has sufficient range to reach all parts of the display tends to be difficult to precisely control because the user has difficulty holding his or her hand steady once the desired cursor position is reached.

Conversely, a remote pointing device that offers precise control within a predefined region of the display may not easily be able to reach other regions on the display. For example, a touch-sensitive controller may allow accurate pointing within a limited range but requires repeated swipes to move to a different region on the display, causing user fatigue.

One non-limiting and exemplary embodiment provides an information input apparatus capable of performing highly accurate and stable remote pointing in the entire range of the display and a method for controlling the information input apparatus.

Solution to Problem

In one general aspect, the information input apparatus disclosed here feature an information input apparatus for a user to control a graphic cursor displayed on a display, the information input apparatus including: a first sensor responsive to user movement of a first type producing first sensor data, the user movement of the first type being motion of a part of a body of the user; a second sensor responsive to user movement of a second type more precise than the first type producing second sensor data, the user movement of the second type being motion of a part of the body of the user; and at least one processor that calculates a hybrid cursor movement signal having a large scale movement component corresponding to the user movement of the first type and a fine scale movement component corresponding to the user movement of the second type and representing movement in a finer scale than the large scale movement component, the hybrid cursor movement signal being for moving the graphic cursor; in which the at least one processor calculates the large scale movement component based on a first sensitivity parameter representing sensitivity of the first sensor with respect to the user movement of the first type, and determined by associating the second sensor data with the first sensor data, and in which the at least one processor calculates the fine scale movement component based on a second sensitivity parameter representing sensitivity of the second sensor with respect to the user movement of the second type, determined by associating the first sensor data with the second sensor data.

Advantageous Effects of Invention

According to the present disclosure, the user movement of the first type and the user movement of the second type cross-pollinate each other and are combined in a collaborative manner by the sensitivity parameters representing the sensitivities of the sensors with respect to the user movement. The movement component corresponding to the user movement is thus calculated, implementing highly precise and stable pointing by the graphic cursors on the display.

Further areas of applicability will become apparent from the description provided herein. The description and specific examples in this summary are intended for purposes of illustration only and are not intended to limit the scope of the present disclosure.

These general and specific aspects may be implemented using a method.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

BRIEF DESCRIPTION OF DRAWINGS

The drawings described herein are for illustrative purposes only of selected embodiments and not all possible implementations, and are not intended to limit the scope of the present disclosure.

DESCRIPTION OF EMBODIMENTS

Figure 1:
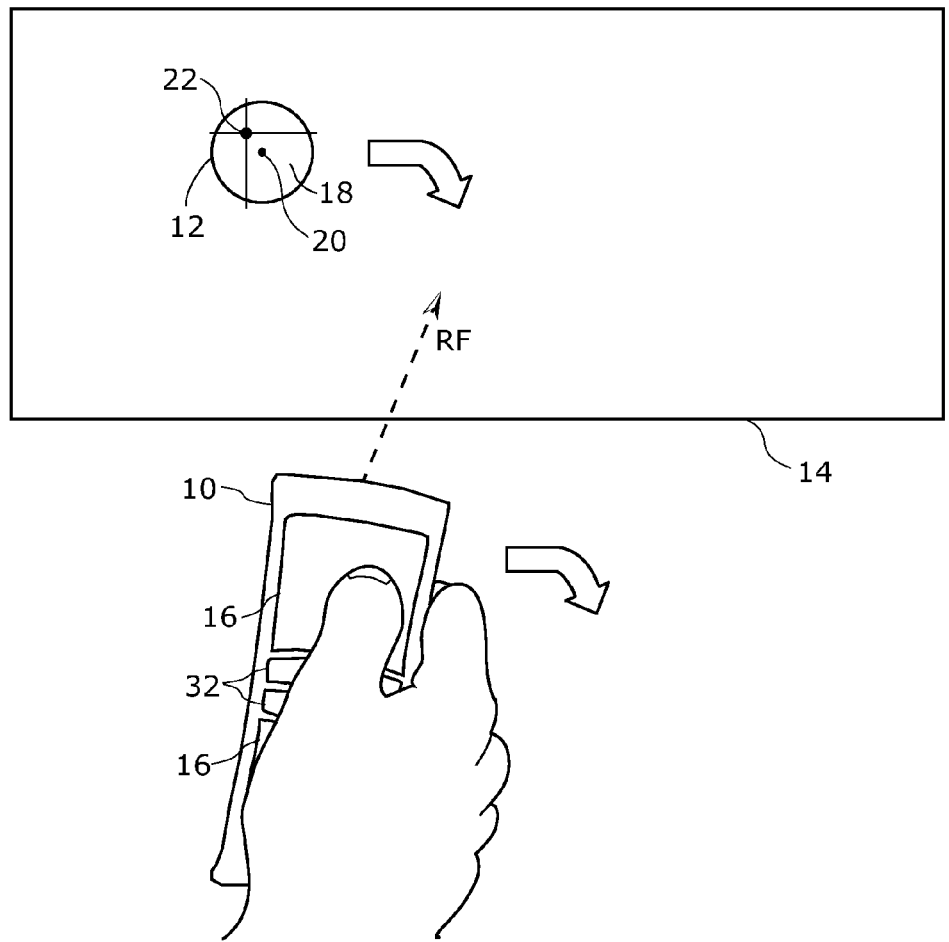
FIG. 1 is a schematic diagram illustrating a handheld controller and a cursor on a display according to the embodiment.

Example embodiments will now be described more fully with reference to the accompanying drawings. Note that components referred to by the same reference numerals over multiple drawings are the same components.

The information input apparatus according to an aspect of the present disclosure includes: a first sensor responsive to user movement of a first type producing first sensor data, the user movement of the first type being motion of a part of a body of the user; a second sensor responsive to user movement of a second type more precise than the first type producing second sensor data, the user movement of the second type being motion of a part of the body of the user; and at least one processor that calculates a hybrid cursor movement signal having a large scale movement component corresponding to the user movement of the first type and a fine scale movement component corresponding to the user movement of the second type and representing movement in a finer scale than the large scale movement component, the hybrid cursor movement signal being for moving the graphic cursor; in which the at least one processor calculates the large scale movement component based on a first sensitivity parameter representing sensitivity of the first sensor with respect to the user movement of the first type, and determined by associating the second sensor data with the first sensor data, and in which the at least one processor calculates the fine scale movement component based on a second sensitivity parameter representing sensitivity of the second sensor with respect to the user movement of the second type, determined by associating the first sensor data with the second sensor data.

According to the configuration, by the sensitivity parameters representing sensor sensitivity responsive to the user movement, the user movement of the first type and the user movement of the second type cross-pollinate each other and are combined in a collaborative manner. As such, the movement component corresponding to each user movement is calculated, implementing highly accurate and stable remote pointing by the graphic cursor on the display.

In the input information apparatus according to an aspect of the present disclosure, when both the user movement of the first type and the user movement of the second type are performed, the at least one processor suppresses the large scale movement component by setting the first sensitivity parameter to be smaller for a more intense user movement of the second type, and suppresses the fine scale movement component by setting the second sensitivity parameter to be smaller for a more intense user movement of the first type.

With this configuration, the movement component for determining the movement of the cursor is weighted according to the movement of the first type or the second type that the user would like to prioritize, thereby improving the operability and stability of the user control for moving the cursor.

In the input information apparatus according to an aspect of the present disclosure, the graphic cursor includes at least a first cursor and a second cursor smaller than the first cursor and positioned in the first cursor, and the at least one processor further sets a size of the first cursor to be smaller for a larger first sensitivity parameter or a smaller second sensitivity parameter.

With this, the user increases the size of the first cursor when the user would like determine a detailed position of the second cursor. Thus, the operability for determining the position of the second cursor is improved.

In the input information apparatus according to an aspect of the present disclosure, the graphic cursor includes at least a first cursor and a second cursor smaller than the first cursor and positioned in the first cursor, and the large scale movement component is a signal component for moving the first cursor and the second cursor, and the fine scale movement component is a signal component for moving the second cursor.

With this configuration, the user can set the first cursor on the display in a large scale first, and then sets the second cursor in a fine scale. Therefore, the user's operability is improved.

In the input information apparatus according to an aspect of the present disclosure, the first sensor is a sensor sensing motion of a hand or arm.

In the input information apparatus according to an aspect of the present disclosure the second sensor is a sensor sensing motion of a finger or thumb.

With this configuration, the user can set the movement range in a large scale by using a hand which is part of the user's body first, and then sets the movement range more precisely by using the finger or the thumb. Furthermore, the large scale movement component and the fine scale movement component are calculated while the motion of the hand and the finger or the thumb are combined interactively, thereby improving the operability of the cursor control using the hand or the finger or thumb.

The input information apparatus according to an aspect of the present disclosure further includes a transmitter for wireless communication between the at least one processor and a display driver for displaying the graphic cursor on the display.

This enables remote pointing using a cursor.

The input information apparatus according to an aspect of the present disclosure includes n sensors including: a k-th sensor responsive to user movement of a k-th type producing k-th sensor data, the user movement of the k-th type being motion of a part of the body of the user; and a (k+1)-th sensor responsive to user movement of a (k+1)-th type more precise than the k-th type producing (k+1)-th sensor data, the user movement of the (k+1)-th type being motion of a part of the body of the user, where 1≤k<n is satisfied, in which the at least one processor (i) calculates a hybrid cursor movement signal having a movement component corresponding to the user movement of the k-th type and a movement component corresponding to the user movement of the (k+1)-th type, (ii) sets a k-th cursor area corresponding to the k-th sensor data, using data obtained by combining the k-th sensor data and other sensor data, and (iii) sets a (k+1)-th cursor area in the k-th cursor area, corresponding to the (k+1)-th sensor data, using data obtained by combining the (k+1)-th cursor data and other sensor data.

With this, the user can cross-pollinate and combine multiple motions using various parts of the body. With this, it is possible to gradually and stably shift the movement of the graphic cursor on the display from a large movement to a precise movement. Highly accurate and stable remote-pointing can thus be achieved.

The present disclosure may also be implemented as the handheld controller having the characteristic units.

The present disclosure may not only be implemented as the information input apparatus including the characteristic units, but also as the method for controlling the information input apparatus having the characteristic units included in the information input apparatus as steps.

Referring to FIG. 1, an information input apparatus according to the embodiment shall be described.

Figure 16:
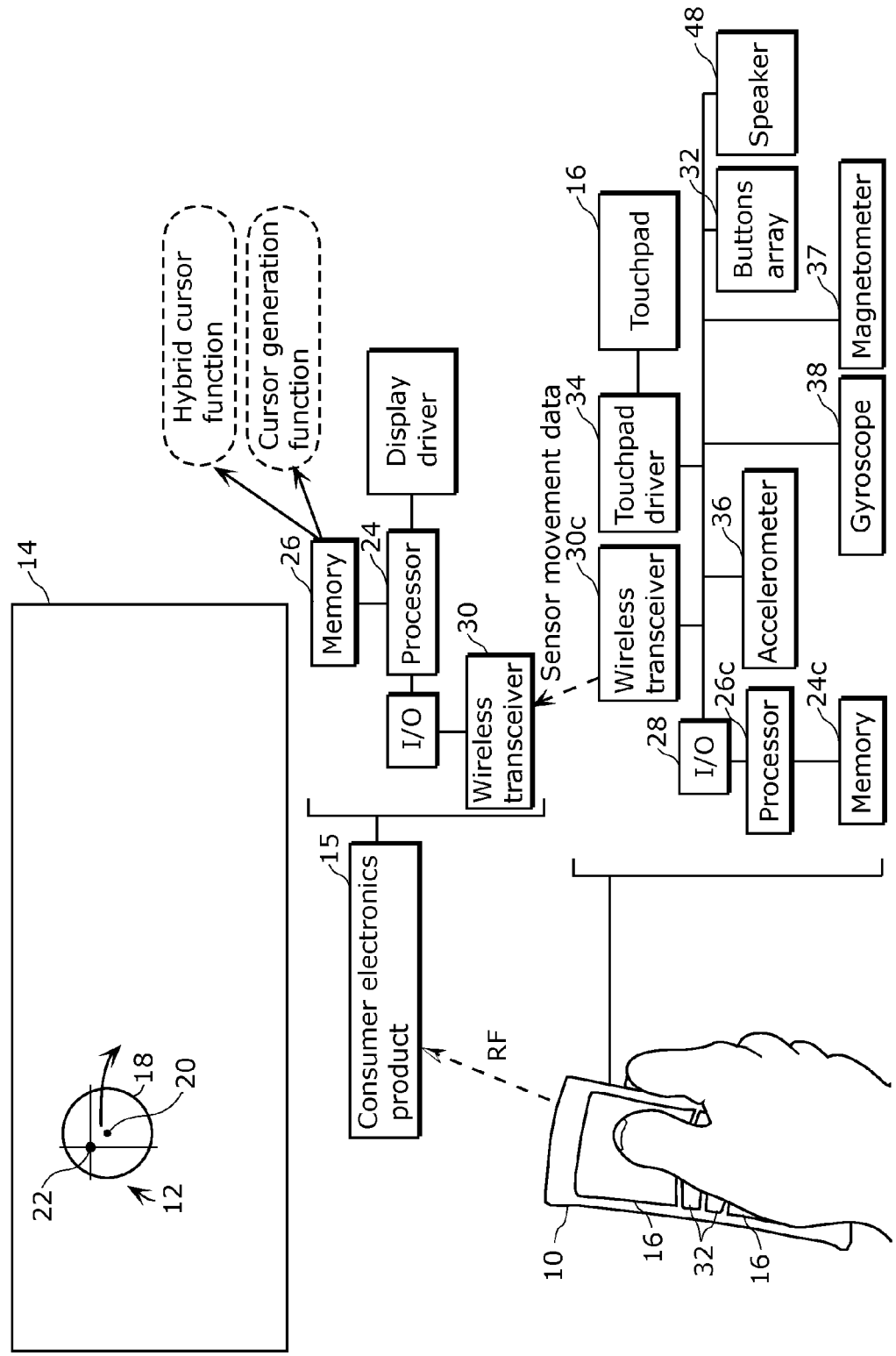
FIG. 16 is a schematic diagram illustrating a handheld controller and a cursor on a display according to a first variation of the embodiment.

FIG. 1 is a schematic diagram illustrating the handheld controller according to the embodiment and the cursor on the display. In this embodiment, a hybrid pointing system for controlling the position, movement and appearance of cursor 12 upon display 14 is composed of a handheld controller 10 which is the information input apparatus. Here, the hybrid pointing system refers to a system in which the cursor on the screen or display is controlled by the function of multiple input sources exemplified by the in-air motion of a hand or arm and the motion of fingers or thumb on the touchpad combined in a collaborative manner. The display 14 may be, for example, the display screen of a consumer electronics entertainment device, such as a widescreen television. The handheld controller 10 communicates wirelessly as by radio frequency (RF) signaling using, for example, wireless WiFi, Bluetooth or the like. The processor and associated electronics for implementing the hybrid pointing system may be packaged entirely within the handheld controller 10 or may be distributed between the handheld controller 10 and the consumer electronics entertainment device. Thus FIG. 16 shows an alternate embodiment where the electronics are distributed between the handheld controller and a receiver device.

The handheld controller 10 according to the embodiment includes at least one touchpad 16 and also includes embedded motion sensing circuitry (discussed below) to detect in-air movement of the controller 10. The handheld controller thus provides two sources of sensor data: in-air motion data and touchpad data that are combined in a hybrid fashion to control how the cursor 12 appears on display 14 and how it moves.

The motion sensing circuitry is a first sensor that generates first sensor data in response to the user movement of the first type. The user movement of the first type is, for example, a motion of the user's hand holding the handheld controller 10. The user movement of the first type may also be a motion of the user's arm. In this case, the first sensor generates the first sensor data in response to the motion of the user's arm.

The touchpad 16 is a second sensor that generates second sensor data in response to the user movement of the second type. The movement range of the user movement of the second type is smaller than the movement range of the user movement of the first type, and the motion is finer than the user movement of the first type. The user movement of the second type is, for example, the motion of the finger or thumb of the user on the touchpad 16.

The cursor 12 is a graphic cursor displayed on the display 14. The cursor 12 defines a rough pointer region 18 which is the first cursor, a precise pointer 22 which is the second cursor disposed within rough pointer region 18 and is smaller than the rough pointer region 18, and a center 20.

As will be more fully described, in-air movement of the handheld controller 10, such as movement from side to side, causes the rough pointer region 18 (and precise pointer 22 within) to move about the display 14, generally tracking with how the user waves the controller in the air. Thus the cursor 12, and specifically the rough pointer region 18 of the cursor 12, effects large scale movement about the display 14. As will be described, the overall size of the rough pointer region 18 varies depending on how the user manipulates the handheld controller 10.

By touching the touchpad 16 with a thumb or finger, the user controls the precise pointer 22 within the rough pointer region 18. Thus the cursor 12, and specifically the precise pointer 22 of the cursor 12, effects fine scale movement within the rough pointer region 18.

Figure 2:
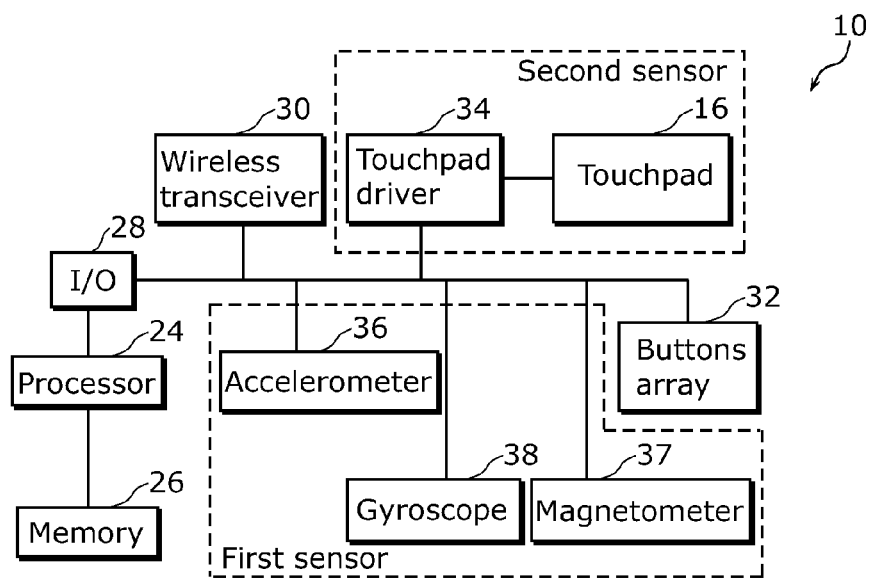
FIG. 2 is a functional block diagram illustrating a handheld controller according to the embodiment.

FIG. 2 is a functional block diagram of the handheld controller according to the embodiment. As illustrated in FIG. 2, the handheld controller 10 includes a touchpad 16, a processor 24, a memory 26, an input-output (I/O) interface circuitry 28, a wireless transceiver 30, a buttons array 32, a touchpad driver 34, an accelerometer 36, a magnetometer 37, and a gyroscope 38.

The accelerometer 36, the magnetometer 37, and the gyroscope 38 are included in the motion sensing circuitry described above, and correspond to the first sensor. The touchpad 16 and the touchpad driver 34 correspond to the second sensor. Note that, more than one touchpad 16 may be provided, and the touchpads 16 may be connected via the touchpad drivers 34.

The processor 24 calculates a hybrid cursor signal for moving the cursor 12, including a large scale movement component corresponding to the user movement of the first type and the fine scale movement component corresponding to the user movement of the second type.

Memory 26 serves as a non-transitory computer-readable medium for storing the program instructions operated upon by the processor 24 to implement the functionality described below. Memory 26 also stores data values from the first and second sensors, internal parameter values, intermediate values calculated by the processor 24 and output data values used to control the cursor 12's position, movement and appearance. The processor 24 is coupled to the I/O 28 that communicates with a variety of different sensors and devices as illustrated.

Coupled to the I/O 28 is the wireless transceiver 30 used to communicate by radio frequency with electronic circuitry associated with the display 14 for display control.

The controller 10 further includes a plurality of pushbuttons comprising a buttons array 32. The user can press these buttons selectively to perform certain frequently used operations such as changing channels or increasing/decreasing audio volume.

The handheld controller 10 may include a speaker which outputs operational sound when the cursor 12 moves in response to the user movement of the first type and the user movement of the second type.

To sense in-air motion, the handheld controller 10 includes one or more inertial sensors (first sensors) such as the accelerometer 36, the magnetometer 37 and the gyroscope 38. The accelerometer 36 produces a signal indicative of the second derivative of linear motion. The accelerometer 36 of the preferred embodiment is a three-axis accelerometer that measures the second derivative of linear motion in a three-dimensional reference frame. The gyroscope 38 produces a signal indicative of rotation and thus has the ability to measure the rate of rotation about a particular axis. The magnetometer 37 produces a signal indicative of the compass pointing direction.

An embodiment may use only gyroscope 38 as the first sensor in the handheld controller 10. This embodiment has the advantage of low cost. However, the gyroscope 38-only solution may experience some drift.

To reduce the effect of this drift, the accelerometer 36 may be combined with the gyroscope 36 in the handheld controller 10.

As illustrated in FIG. 2 the magnetometer 37 may be added to the accelerometer 36 and the gyroscope 38 in the handheld controller 10. Addition of the magnetometer 37 further reduces problems with drift and gives the handheld controller 10 knowledge of actual pointing direction with respect to a geographic reference frame, such as true North-South-East-West, for example; as opposed to merely relative motion information.

As an alternative or addition to inertial sensors, an optical tracking system may also be used. The optical tracking system uses an infrared camera on the remote control, which tracks infrared light emitting diodes disposed along the top or bottom of the display 14.

As previously noted, the processor and electronics for implementing the hybrid pointing system including the handheld controller 10 and the display 14 and control method for the system can be deployed in the handheld controller 10 alone, or distributed across other components, such as a receiver, blue ray disc player, television receiver, audio-video processor and the like. See FIG. 16, for example.

FIG. 16 is a schematic diagram illustrating a handheld controller and a cursor on a display according to a first variation of the embodiment. As illustrated in FIG. 16, the handheld controller 10 includes the touchpad 16, a processor 26c, a memory 24c, the I/O 28, a wireless transceiver 30c, the buttons array 32, the touchpad driver 34, the accelerometer 36, the magnetometer 37, the gyroscope 38, and a speaker 48. The consumer electronics product 15 includes the processor 24, the memory 26, the wireless transceiver 30, an I/O, and a display driver.

The display 14 is coupled to a consumer electronics product 15, such as a receiver, blue ray disc player, television receiver, audio-video processor and the like. The processor and electronics used to implement the hybrid pointing system are distributed across the handheld controller 10 and consumer electronics product 15. In other words, some of the components making up the information input apparatus are deployed within the handheld controller 10 while other components are deployed within the consumer electronics product 15. FIG. 16 illustrates one possible distribution. More specifically, the information input apparatus according to the present disclosure includes the handheld controller 10 and the consumer electronics product 15, and the touchpad 16 which is the second sensor, the accelerometer 36 which is the first sensor, the magnetometer 37 and the gyroscope 38 are disposed within the handheld controller 10, and the processor 24 that calculates the hybrid cursor movement signal is disposed separate from the handheld controller 10, such as within the consumer electronics product 15. If desired, the processor (or processors) used to implement the hybrid pointing system may be shared with the cursor generation and display system or define part of the cursor generation and display system.

The handheld controller 10 includes a processor 26c with associated memory 24c that communicates through its I/O 28 to supply sensor movement data obtained from the first and second sensors to the consumer electronics product 15 via the wireless transceiver pair: transceiver 30c (on the handheld controller) and transceiver 30 (on the consumer electronics product).

The processor 24 within the consumer electronics product 15 then uses this sensor movement data to calculate the hybrid cursor movement signal.

In this variation, the speaker 48 for outputting operating sound from the handheld controller 10 is further disposed. With this, the information input apparatus according to the present disclosure is capable of changing the operation sound when the cursor 12 moves in response to the user movement of the first type and the user movement of the second type, and outputs the operation sound. With this, when the user moves the cursor on the display 14 using the handheld controller 10, it is possible to perform the operation only relying on the vision of the user, but also on the hearing. This improves the operability of the information input apparatus. Note that, the speaker 48 may be disposed in the consumer electronics product 15.

In general, the information input apparatus according to the present disclosure may include any plural number of sensors (two or more), and the method for controlling the information input apparatus can be implemented using any plural number of sensors. The controller 10 in this embodiment uses two sensors: an in-air motion sensor (the first sensor) and a touchpad sensor (the second sensor). This is a special case of the more general case where a plurality n sensors may be used. Thus the information input apparatus and the method for controlling the information input apparatus may, for example, combine the outputs from three or more sensors in a particular application. Moreover, while the plural sensors are each disparate in nature (the in-air motion sensor provides data that is different in kind from the data provided by the touchpad sensor), many options are possible besides the ones described in FIG. 2.

Figure 3A:
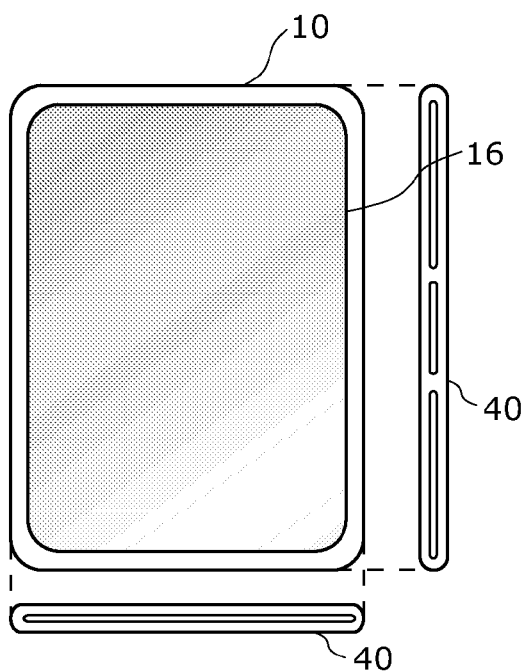
FIG. 3A is an external view of a handheld controller according to a second variation of the embodiment.
Figure 3B:
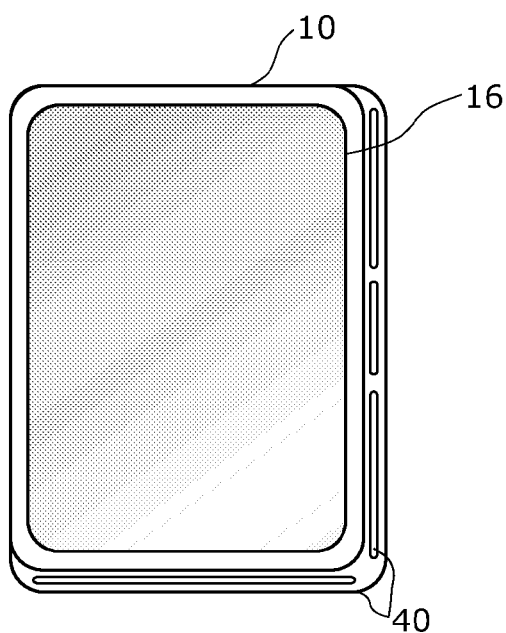
FIG. 3B is an external view of a handheld controller according to a third variation of the embodiment.
Figure 3C:
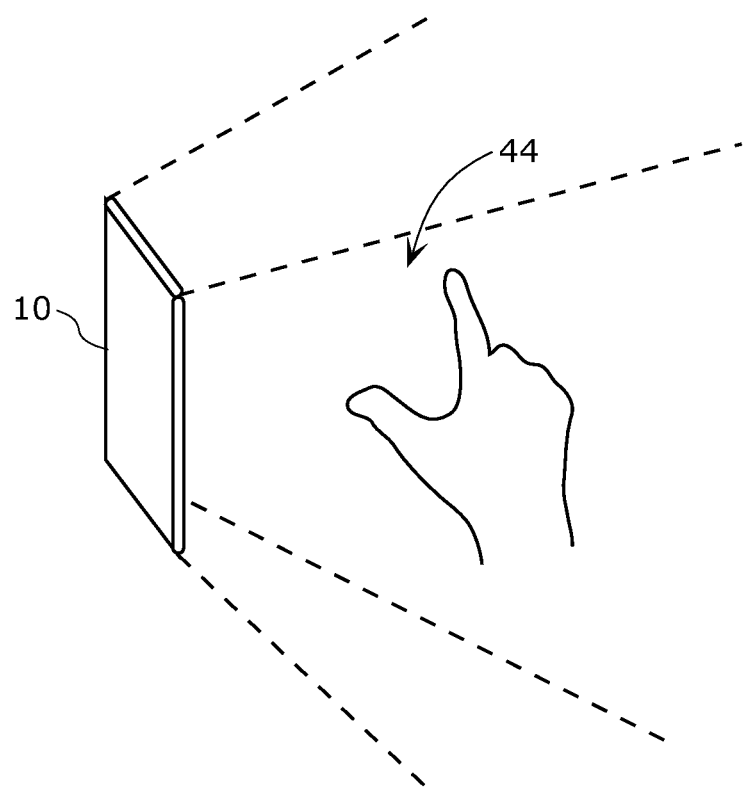
FIG. 3C illustrates a positional relationship between the handheld controller according to the third variation of the embodiment and a non-contact gesture.

FIG. 3A is an external view of the handheld controller according to a second variation of the embodiment, and FIG. 3B is an external view of the handheld controller according to a third variation of the embodiment. FIG. 3C illustrates a positional relationship between the handheld controller according to the third variation of the embodiment and non-contact gesture. For example, as shown in FIGS. 3A and 3B, the touchpad 16 can be incorporated into a device 40 that sense non-contact gestures 40. The device 40 senses in-air motion of the user's hand within the near field region 44 proximate the handheld controller 10, as illustrated in FIG. 3C. More specifically, in the second and third variations according to the embodiment, even if the handheld controller 10 does not move with the user, the processor 24 can generate a hybrid cursor movement signal based on the first sensor data from the device 40 which senses the motion of the hand in a contact-less manner and the second sensor data from the touchpad 16.

Variations in hardware components of the information input apparatus according to the present disclosure are also possible as described above.

Figure 4:
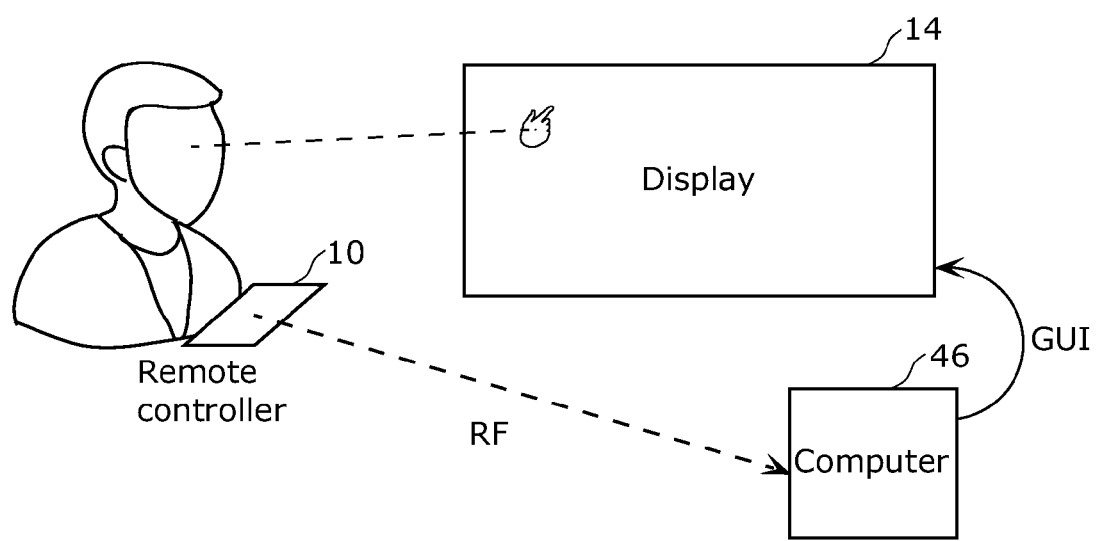
FIG. 4 is a schematic diagram illustrating a handheld controller and a cursor on a display according to a fourth variation of the embodiment.

FIG. 4 is a schematic diagram illustrating the handheld controller according to the fourth variation of the embodiment and the cursor on the display. FIG. 4 shows yet another embodiment where the handheld controller 10 communicates wirelessly with a computer 46 and the display 14 is attached to the computer.

The information input device and the method for controlling the information input device according to the embodiment and the variation take signals from disparate sensors and combines them in a unique, collaborative way. In this regard, the embodiment illustrated in FIGS. 1 and 2 is a two-sensor embodiment where motion data and touchpad data are combined.

Furthermore, the following is the variations of the second sensor.

Figure 5B:
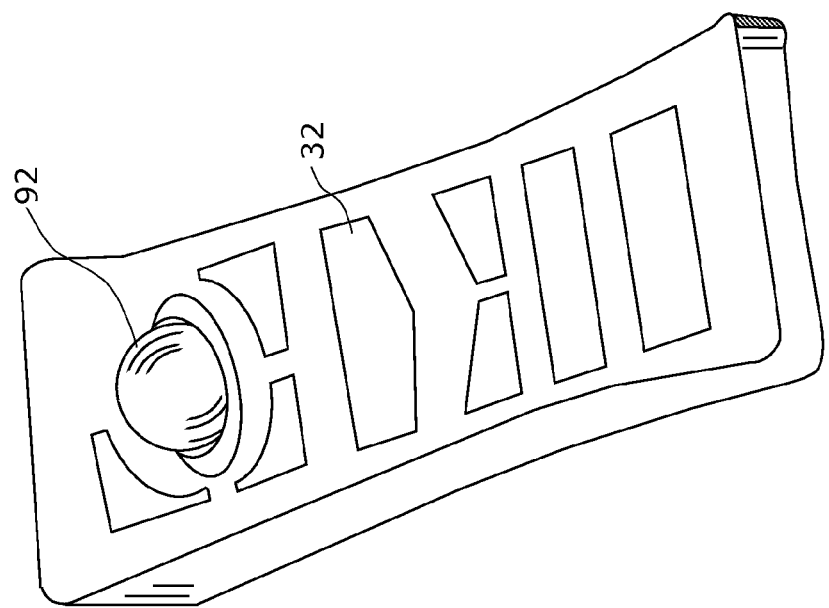
FIG. 5B is an external view of a handheld controller according to a sixth variation of the embodiment.
Figure 5A:
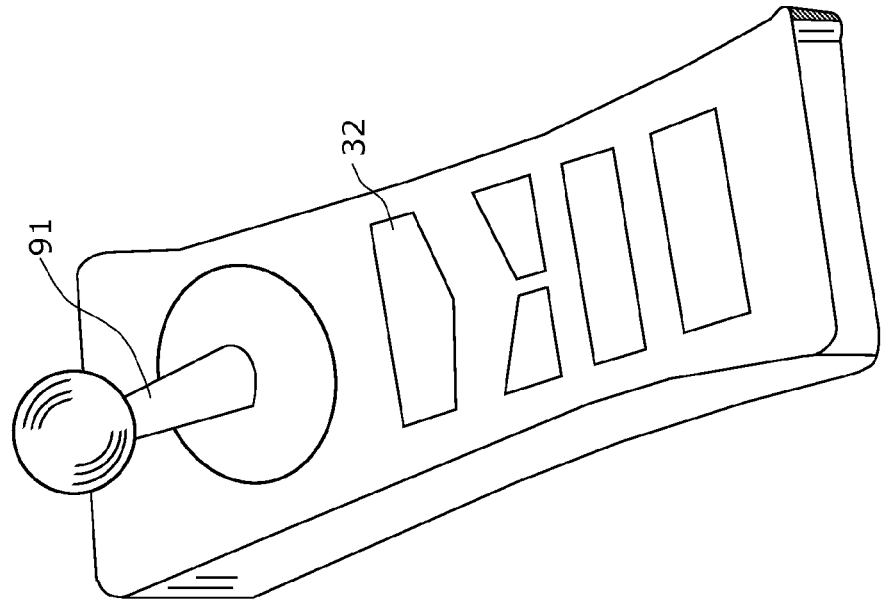
FIG. 5A is an external view of a handheld controller according to a fifth variation of the embodiment.

FIG. 5A is an external view of the handheld controller according to a fifth variation of the embodiment, and FIG. 5B is an external view of the handheld controller according to a sixth variation of the embodiment. The handheld controller illustrated in FIG. 5A is different from the handheld controller in FIG. 1 and FIG. 2, only in the configuration of the second sensor, which is a joystick 91 disposed instead of the touchpad 16. With this configuration, the processor 24 calculates the large scale movement component corresponding to the hand motion associated with the tilt information, and calculates the fine scale movement component corresponding to the tilt information of the joystick 91 associated with the hand motion.

The handheld controller illustrated in FIG. 5B is different from the handheld controller illustrated in FIG. 1 and FIG. 2 only in the configuration of the second sensor, and includes a trackball 92 disposed instead of the touchpad 16. According to this configuration, the processor 24 calculates the large scale movement component corresponding to the hand motion associated with rotational information of the track ball 92, and calculates the fine scale movement component corresponding to the rotational information of the track ball 92 associated with the hand motion.

Figure 6:
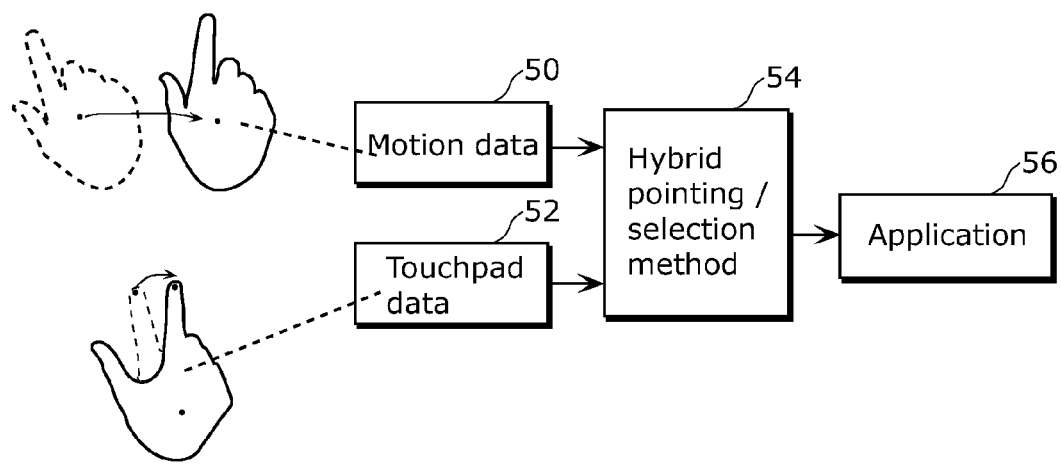
FIG. 6 is a conceptual diagram illustrating a method for controlling the information input apparatus according to the embodiment.

FIG. 6 shows the concept of the method for controlling the information input apparatus according to the embodiment. Motion data 50 (the first sensor data) obtained from the first sensor, and touchpad data 52 (the second sensor data) obtained from the second sensor, are supplied to the processor 24 implementing a hybrid pointing/selection method 54 which combines the respective data in a collaborative way. Although the motion data 50 is used to control the rough pointer region 18 which is the first cursor in FIG. 1, and touchpad data 52 is used to control the precise pointer 22 which is the second cursor in FIG. 1, the motion and touchpad data cross-pollinate one another by the processor 24, such that movement of the rough pointer region 18 is also effected by touchpad data 52 and movement of the precise pointer 22 is effected by motion data 50.

The hybrid pointing/selection method 54 performed by the processor 24 then supplies an application 56 which may handle the actual cursor generation on the display 14 with a hybrid cursor movement signal. In other words, the application 56 is responsible for generating the graphical appearance of the cursor and places that the cursor 12 at a location on the display 14 based on the results of the hybrid pointing/selection method 54.

Of course, the application 56 is not necessarily limited to generating the cursor 12 on the display 14. Additional application functionality can also be implemented. In this regard, the hybrid pointing/selection method 54 provides the raw cursor location and cursor size information that the application 56 can use to achieve the desired goals of the application. Thus, a video game application, for example, might use the location and cursor size information from the method 54 to control movement of a character or player in the game. In such an implementation, the movement of the rough pointer region 18 might be used to control the position of the character's body, while the movement of the precise pointer 22 might be used to control the character's arms.

The hybrid pointing/selection method 54 which is the method for controlling the information input apparatus offers several advantages. One advantage is to enable cascading control where each different sensor controls a pointing range of different precision. This has been illustrated in FIG. 7.

Figure 7:
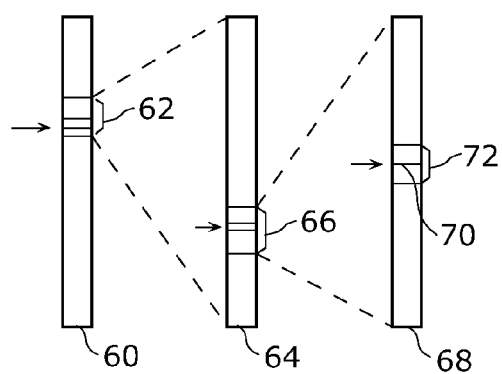
FIG. 7 illustrates a cascading control of the information input apparatus according to the embodiment.

FIG. 7 illustrates the cascading control of the information input apparatus according to the present disclosure. Three sensors have been utilized in the embodiment in FIG. 7. The first sensor responds to a first positional range 60. The user's input is captured by the first sensor to identify or highlight a first selection range 62, which is then amplified and presented as second positional range 64. In this amplified view, the user's selection is made responsive to the section sensor, allowing the user to more precisely highlight or select the second selection range 66. The second selection range 66 is then amplified as third positional range 68, and the third sensor responses to the user's selection. This allows the user to finally highlight a very precise point 70 within the third selection range 72.

By virtue of the hybrid manner described above in which the respective sensor data are combined, the output of one stage is also related to the sensor signals of other stages. Each sensor's range may thus be used in a cascading manner where the output of a first stage is used to constrain the search space of the next stage. In other words, signal processing of any sensor source level depends on the signals from other sensor sources. The result is an accurate, stable and responsive cursor position and cursor size that dynamically adapts to the user's intentions.

The hybrid pointing/selection method 54 which is the method for controlling the information input apparatus shall be specifically described below.

Figure 8:
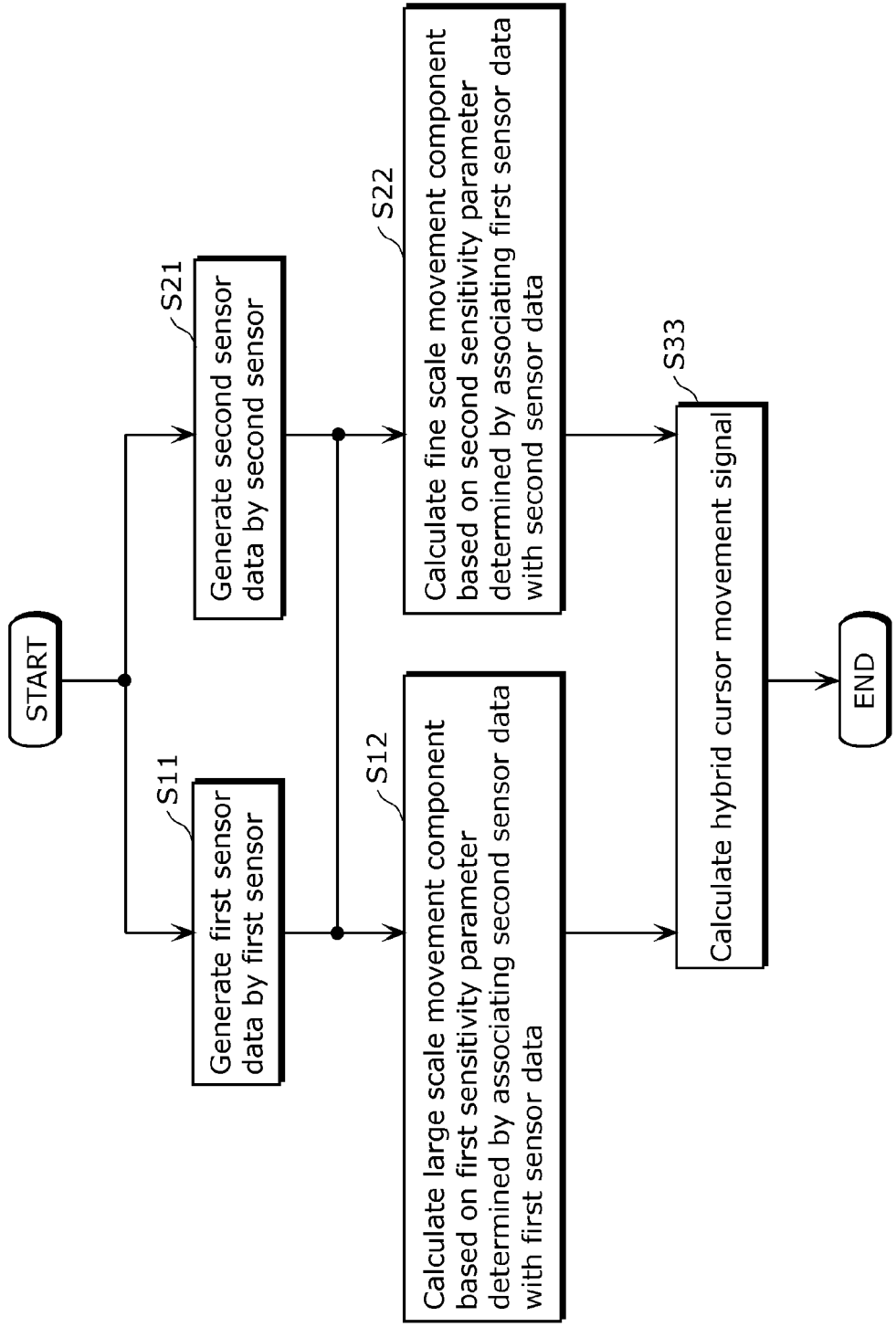
FIG. 8 is an operational flowchart illustrating the method for controlling the information input apparatus according to the embodiment.
Figure 9:
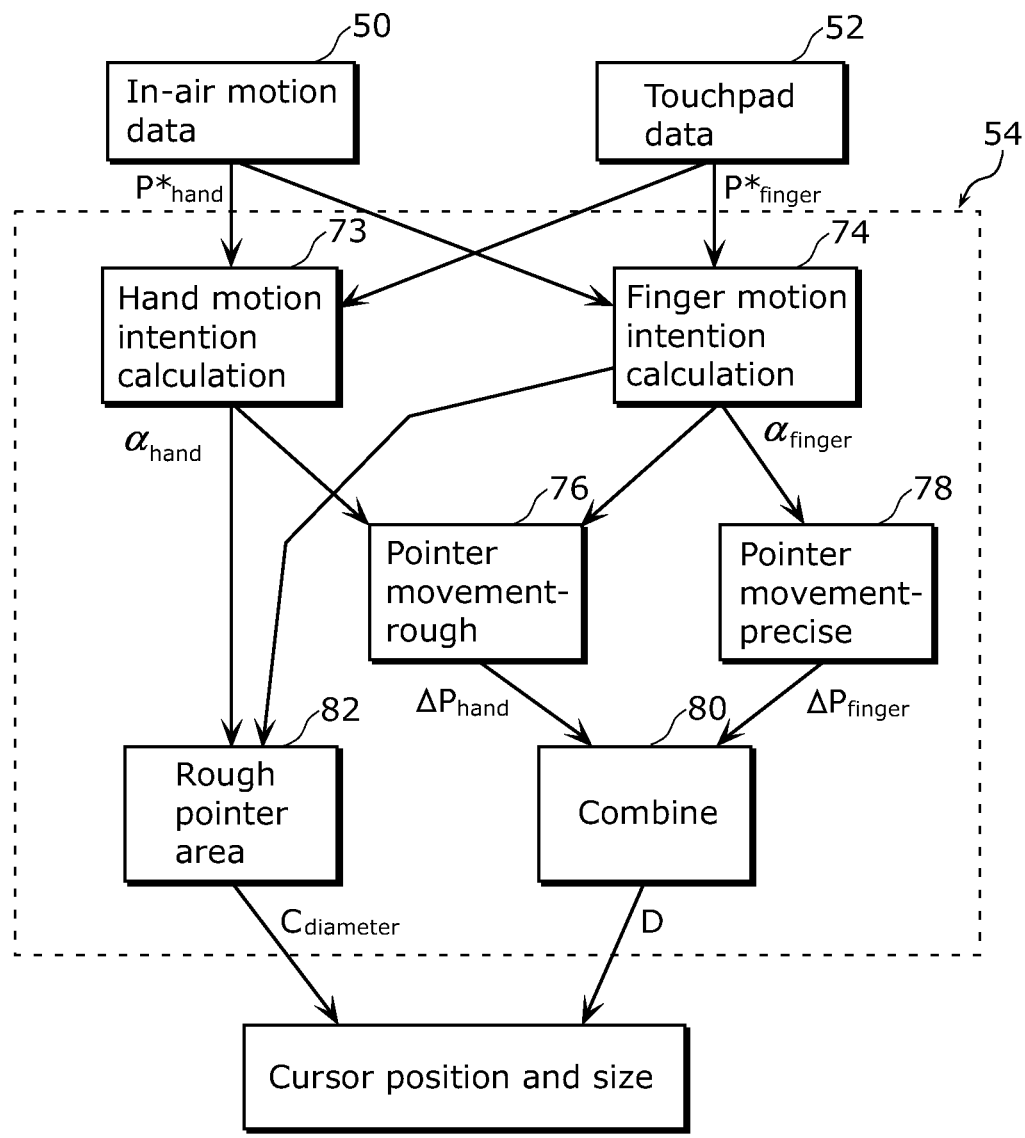
FIG. 9 is an operational flowchart specifically describing the method for controlling the information input apparatus according to the embodiment.

FIG. 8 is an operational flowchart for illustrating the method for controlling the information input apparatus according to the present disclosure. FIG. 9 is an operational flowchart specifically illustrating the method for controlling the information input apparatus according to the embodiment.

The hybrid pointing/selection method 54 which is the method for controlling the information input apparatus according to the present disclosure is implemented by programming processor 24 using program instructions stored in memory 26, for example.

First, the processor 24 causes the first sensor responsive to the user movement of the first type to generate the first sensor data (S11).

In addition, the processor 24 causes the second sensor responsive to the user movement of the second type which has a smaller movement range than the movement range of the user movement of the first type and is more precise than the user movement of the first type (S21).

More specifically, with regard to step S11 and step S21, the motion data 50 ($P^*_{hand}$) which is the first sensor data is supplied to the processor 24 by the first sensor responsive to the motion of the hand in the space corresponding to the user movement of the first type, as illustrated in FIG. 9. The second sensor responsive to the finger motion on the touchpad 16 corresponding to the user movement of the second type supplies the touchpad data 52 ($P^*_{finger}$) which is the second sensor data to the processor 24.

Next, the processor 24 calculates the large scale movement component corresponding to the user movement of the first type, based on the first sensitivity parameter representing the sensitivity of the first sensor corresponding to the user movement of the first type, determined by associating the second sensor data with the first sensor data (S12).

Next, the processor 24 calculates the fine scale movement component corresponding to the user movement of the second type, based on the second sensitivity parameter representing the sensitivity of the second sensor corresponding to the user movement of the second type, determined by associating the first sensor data with the second sensor data (S22).

More specifically, at step S12 and step S22, motion data 50 are fed to the hand motion intention calculation processor 73 which is part of the processor 24 to extract the user's intentions from hand movement gestures being made, as illustrated in FIG. 9. Motion data 50 is also supplied to the finger motion intention calculation processor 74 so that the hand motion intention is extracted in consideration with the manner in which the user is performing hand gestural movement will have some bearing on how the system interprets finger motion obtained from the touchpad data 52.

In a similar fashion, touchpad data 52 are fed to the finger motion intention calculation processor 74 which is part of the processor 24, and also to the hand motion intention calculation processor 73. Thus, the hand motion intention calculation results are somewhat dependent on what the user is doing with the touchpad while the in-air gestural motions are being performed.

The hand motion intention calculation processor 73 and the finger motion intention calculation processor 74 generate motion sensitivity parameters represented herein by α. More specifically, hand motion intention calculation processor 73 computes a sensitivity parameter with regard to hand motion $\alpha_{hand}$ as in the expression 1:

$$\alpha_{hand}(t) = \begin{cases} 1, & \text{Finger or thumb not touching touchpad} \\ \dfrac{1}{1+|\Delta P^*_{finger}(t)|A_0} & \text{Finger or thumb touching touchpad} \end{cases} \quad \text{(Expression 1)}$$

$A_0$ is constant, e.g., 10. $\Delta P^*_{hand}(t)$ is raw sensor data (the amount of change in vector) at time t output from the touchpad sensor.

Similarly, finger motion intention calculation processor 74 generates the motion sensitivity parameter with regard to finger motion $\alpha_{finger}$ as in the expression 2:

$$\alpha_{finger}(t) = \dfrac{1}{1+|\Delta P^*_{hand}(t)|B_0} \quad \text{(Expression 2)}$$

$B_0$ is constant; e.g., 10. Furthermore, $\Delta P^*_{hand}(t)$ is raw sensor data (the amount of change in vector) at time t output from the motion sensor.

For example, according to the Expression 2, the motion sensitivity parameter $\alpha_{finger}(t)$ is high when user is not performing in-the-air motion, and lower when user is performing intensive in-the-air motion.

When both the hand motion which is the user movement of the first type and the finger motion which is the user movement of the second type are performed, the large scale movement component is suppressed by setting the first sensitivity parameter $\alpha_{hand}(t)$ to be smaller for a more intense user movement of the second type. In contrast, the fine scale movement component is suppressed by setting the second sensitivity parameter $\alpha_{finger}(t)$ to be smaller for a more intense user movement of the first type.

The rough pointer movement processor 76 which is a part of the processor 24 calculates the rough pointer movement variable $\Delta P_{hand}(t)$ as shown in expression 3, by using the sensitivity parameter $\alpha_{hand}(t)$ calculated by the hand motion intention calculation processor 73.

$$\Delta P_{hand}(t) = \alpha_{hand}(t)(P^*_{hand}(t) - P^*_{hand}(t-1)) \quad \text{(Expression 3)}$$

Here, $\Delta P_{hand}(t)$ is the amount of vector in the rough pointer region 18 which changes as a time function. Furthermore, $P^*_{hand}(t)$ and $P^*_{hand}(t-1)$ are raw input values from the motion sensor in the time t and the time (t−1).

The rough pointer movement variable $\Delta P_{hand}(t)$ calculated as described above corresponds to the large scale movement component corresponding to the user movement of the first type based on the first sensitivity parameter ($\alpha_{hand}(t)$) representing the sensitivity of the first sensor (motion sensor) responsive to the user movement of the first type (hand motion).

Similarly, the precise pointer movement processor 78 which is a part of the processor 24 calculates a precise pointer movement variable $\Delta P_{finger}(t)$ as shown in Expression 4, using the sensitivity parameter $\alpha_{finger}(t)$ calculated by the finger motion intention calculation processor 74.

$$\Delta P_{finger}(t) = \alpha_{finger}(t)(P^*_{finger}(t) - P^*_{finger}(t-1)) \quad \text{(Expression 4)}$$

Here, $\Delta P_{finger}(t)$ denotes the amount of vector of the precise pointer 22 which changes as a time function. Furthermore, $P^*_{finger}(t)$ and $P^*_{finger}(t-1)$ are raw input values from the touchpad sensor in the time t and time (t−1), respectively.

The precise pointer movement variable $\Delta P_{finger}(t)$ calculated as described above corresponds to the fine scale movement component corresponding to the user movement of the second type, based on the second sensitivity parameter ($\alpha_{finger}(t)$) representing the sensitivity of the second sensor (touchpad sensor) responsive to the user movement of the second type (finger motion).

Note that, when the rough pointer movement variable $\Delta P_{hand}(t)$ and the precise pointer movement variable $\Delta P_{finger}(t)$ corresponding to time difference in sensor are extremely small, the variables may be determined as denoting a displaced motion not intended by the user, and the movement values of the pointer or the cursor may be determined as 0, using the following expression 5 and expression 6.

$$\text{if } \Delta P_{hand}(t) < P_{hand}th, \Delta P_{hand}(t) = 0 \quad \text{(Expression 5)}$$

$$\text{if } \Delta P_{finger}(t) < P_{finger}th, \Delta P_{finger}(t) = 0 \quad \text{(Expression 6)}$$

Here, $P_{hand}th$ and $P_{finger}th$ denote thresholds indicating boundaries between the motion intended by the user and the motion not intended by the user. The processing allows cancelling slight displacement (noise) in the user's motion.

Finally, by combining the large scale movement component and the fine scale movement component, the hybrid cursor movement signal which is a signal for moving the graphic cursor is calculated (S33). More specifically, the rough pointer movement variable $\Delta P_{hand}(t)$ and the precise pointer movement variable $\Delta P_{finger}(t)$ are combined by the processor 80 which is a part of the processor 24, and a vector D is generated. The vector D is represented as in the following expression 7.

$$D(t) = D(t-1) + \sum_{n=1}^{N} S_n \cdot \Delta P_n(t) \qquad \text{(Expression 7)}$$

Here, $S_n$ denotes a coefficient for weighting the sensor n, and $\Delta P_n(t)$ is a movement variable of the pointer corresponding to the sensor n. Stated differently, the expression 7 indicates that the cursor movement is a combination of the movement data from all of the sensors. The above description corresponding to the embodiment may be represented as the following expression 8.

$$D(t) = D(t-1) + (S_{hand} \cdot \Delta P_{hand}(t) + S_{finger} \cdot \Delta P_{finger}(t)) \qquad \text{(Expression 8)}$$

In this embodiment, $S_{hand}=1$, and $S_{finger}<1$, for example (=0.2). More specifically, according to the set value, the in-air hand motion covers the entire display space, and the finger movement covers small areas.

As described above, according to the method for controlling the information input apparatus according to the embodiment, the first sensor data is produced by the first sensor responsive to user movement of a first type; the second sensor data is produced by the second sensor responsive to user movement of a second type more precise than the first type; a large scale movement component corresponding to the user movement of the first type is calculated based on a sensitivity parameter ($\alpha_{hand}$) determined by associating the second sensor data with the first sensor data; and a fine scale movement component corresponding to the user movement of the second type and representing movement in a finer scale than the large scale movement component is calculated based on a sensitivity parameter ($\alpha_{finger}$) determined by associating the first sensor data with the second sensor data. By using the large scale movement component and the fine scale movement component, the hybrid cursor movement signal (D) which is a signal for moving the graphic cursor on the display is generated.

The handheld controller 10 according to the embodiment includes an in-air motion sensor that produces a first signal (first sensor data) indicative of movement of the handheld controller with respect to a first reference frame; a touch sensor responsive to contacting motion of a user's finger or thumb that produces a second signal (second sensor data) indicative of movement of the user's finger or thumb with respect to a second reference frame associated with a surface area of the touch sensor touched by the user's finger or thumb; and at least one processor that calculates cursor size and position data of the graphic cursor, in which the at least one processor calculates size and position data of the rough pointer region 18 which is the first cursor corresponding to the movement of the handheld controller and size and position data of the precise pointer 22 which is the second cursor smaller than the first cursor and corresponding to the contacting motion of the user's finger or thumb, by combining the first signal and the second signal that are weighted according to intensity of the first signal and the second signal.

With this, the user can cross-pollinate and combine multiple motions using various parts of the body. With this, it is possible to gradually and stably shift the movement of the graphic cursor on the display from a large movement to a fine movement. Highly accurate and stable remote-pointing can thus be achieved.

In addition to controlling cursor position information, the hybrid pointing/selection method 54 can also control the visual appearance of the cursor such as controlling the rough pointer region as was illustrated at 18 in FIG. 1. Thus, the hybrid pointing/selection method 54 includes a rough pointer region appearance processor 82 that uses the parameters $\alpha_{hand}$ and $\alpha_{finger}$ to generate a cursor size $C_{diameter}$ in the rough pointer region 18 as represented by the following Expression 9:

$$C_{diameter} = S_{finger} \cdot \alpha_{finger}(t) \qquad \text{(Expression 9)}$$

Cursor size $C_{diameter}$ is defined by scale factor of finger motion $S_{finger}$, and reduced to smaller size when $\alpha_{finger}(t)$ is small (e.g., Cursor size $C_{diameter}$ is small when user is performing intensive hand in-the-air motion, and becomes larger when user's hand is steady in the air).

For FIGS. 10 and 11, the manner of programming processor 24 will now be discussed.

Figure 10:
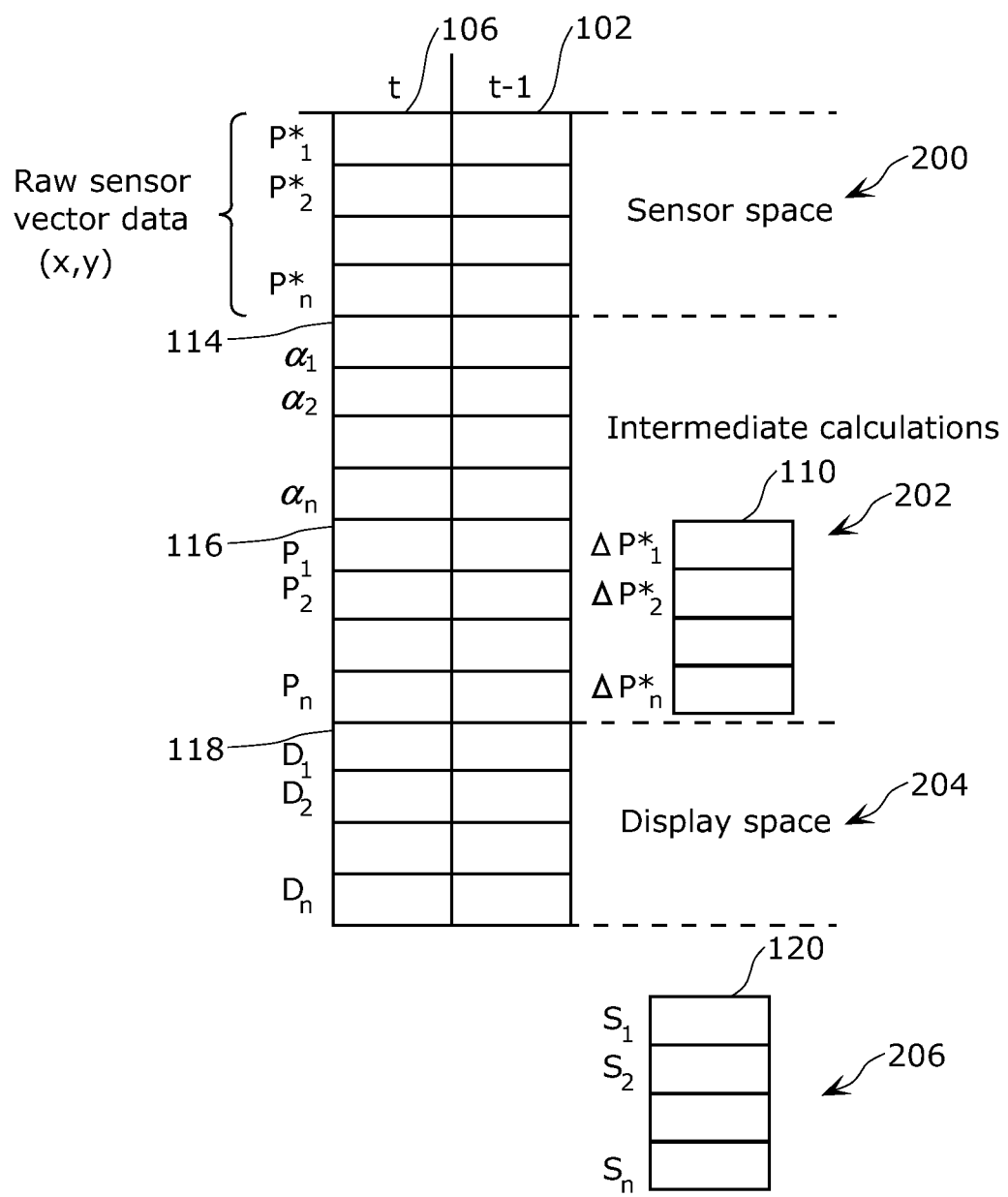
FIG. 10 illustrates a data structure in a memory when a processor in the information input apparatus performs a hybrid pointing control.
Figure 11:
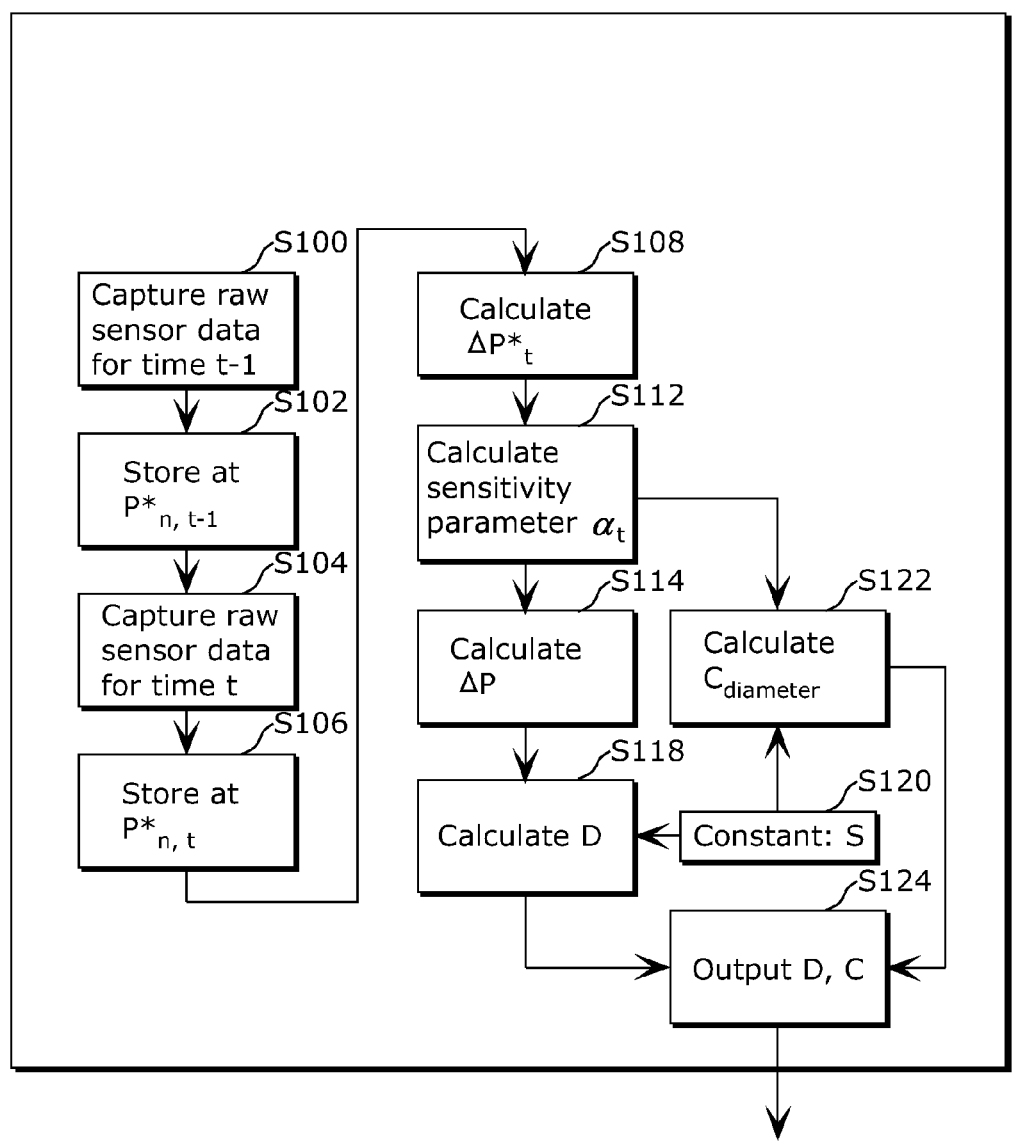
FIG. 11 is an operational flowchart illustrating a hybrid pointing control for a specific sensor.

FIG. 10 illustrates a data structure in a memory when a processor in the information input apparatus performs a hybrid pointing control. FIG. 11 is an operational flowchart illustrating a hybrid pointing control for a specific sensor. The processor 24 illustrated in FIG. 2 is programmed to implement each of the processors described in FIG. 9. While all of these processing functions can be implemented using a single processor such as a microprocessor disposed within controller 10 in this embodiment, alternative embodiments are possible where multiple processors are used and distributed among plural components, such as the controller 10 and the consumer electronics product 15 being controlled by controller 10 or other suitable components. More specifically, FIG. 10 depicts a data structure that is implemented in the memory 26 and the processor 24 is programmed to perform the steps and calculations illustrated in FIG. 11. Recognize that the steps in FIG. 11 work with multiple sensors and multi-dimensional vector quantities, for example. For example, as shown in FIG. 1, two sensors are used and the operation is performed upon vector positions having both a horizontal position x and a vertical position y. Thus, in FIG. 11, the illustrated steps are intended to be performed for each sensor and for each dimension in the vector. FIG. 11 illustrates the sequence for a single sensor within the vector, and it will be understood that the same process would be repeated for each dimension of a given sensor and then further repeated (all dimensions) for the other sensor or sensors.

At step S100, the processor 24 captures raw sensor data for time (t−1). In other words, at a designated starting time (t−1), the raw sensor data is captured and stored in a storage area 102 illustrated in FIG. 10 (S102). Next, at step S104, the processor 24 captures raw sensor data for a later time t, and stores that raw data at the storage area 106 illustrated in FIG. 10 (S106).

Once two raw sensor data values have been obtained for the different times (t−1) and t, a difference calculation is performed at step S108 and then the result is temporarily stored at the storage area 110 shown in FIG. 10. This intermediate difference calculation is then used to calculate the sensitivity parameter $\alpha(t)$ at step S112. In this regard, Expressions 1 and 2 above are exemplary sensitivity parameter calculations for the hand and finger $\alpha_{hand}(t)$ and $\alpha_{finger}(t)$ illustrated in FIG. 1. The sensitivity parameter $\alpha(t)$, so calculated, may then be stored at the storage area 114 illustrated in FIG. 10.

Next, at step S114, the sensor movement value $\Delta P$ is calculated. There are two methods to perform this step. The first method calculates the sensor movement as a relative value by multiplying the sensitivity parameter α(t) with the calculated difference stored at the storage area 110, as shown in the following expression 10. The second method performs an absolute movement calculation where a position value is calculated and stored at the storage area 116 illustrated in FIG. 10 by adding the relative movement value to a previously stored absolute position from time t−1.

$$\Delta Pn(t)=\alpha_n(t)\cdot(P^*n(t)P^*n(t-1)) \qquad \text{(Expression 10)}$$

$$\Delta Pn(t)=\alpha_n(t)\cdot(P^*n(t)-P^*n(t-1)),$$

and:

$$Pn(t)=Pn(t-1)+\Delta Pn(t) \qquad \text{(Expression 11)}$$

Then at step S118, the resultant cursor coordinate value D(t) is calculated and stored at the storage area 118 illustrated in FIG. 10 using the calculation of expression 7 above. This calculation uses a constant value S stored at the storage area 120 illustrated in FIG. 10.

Meanwhile, the cursor size $C_{diameter}$ calculation is performed at step S122 using both the sensitivity parameters α(t) calculated at step S112 and also using the constant S. In the illustrated embodiment, the cursor is presented as a circle that has a diameter that dynamically changes. It will be appreciated that cursors of other shapes and configurations are also possible, in which case the calculated value at step S122 might represent some other parameter rather than diameter.

The calculated position D (t) and cursor size $C_{diameter}$ are then output at step S124. This output is then fed to the application 56 (FIG. 6).

The procedure thus described is figuratively repeated for subsequent time intervals so that the value at time t for a current iteration becomes the value for (t−1) for the next iteration. With reference to the data structure diagram of FIG. 10, it can be seen that the values stored at the storage area 200 correspond to raw data measured within the sensor space, whereas values stored at the storage area 204 represent calculated positions within the display space (i.e., coordinates on the display screen). Values stored at the storage area 202 represent intermediate calculations and the values at the storage area 206 represent constants.

One can see how the sensitivity parameters α(t) provide varying degrees of influence depending on what the user is doing and these changes in sensitivity parameters α(t) are reflected in how the cursor moves on the display 14.

Figure 12A:
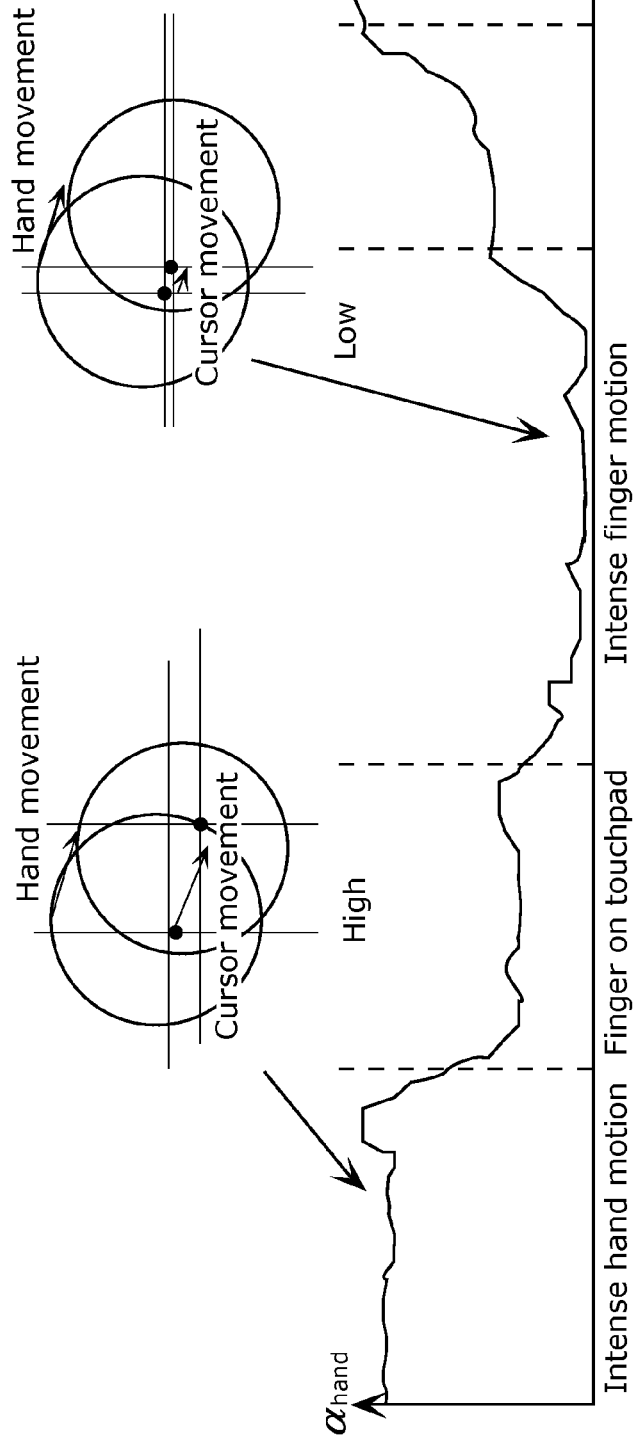
FIG. 12A is a graph illustrating the change in a sensitivity parameter $\alpha_{hand}$ with regard to a user's motion.
Figure 12B:
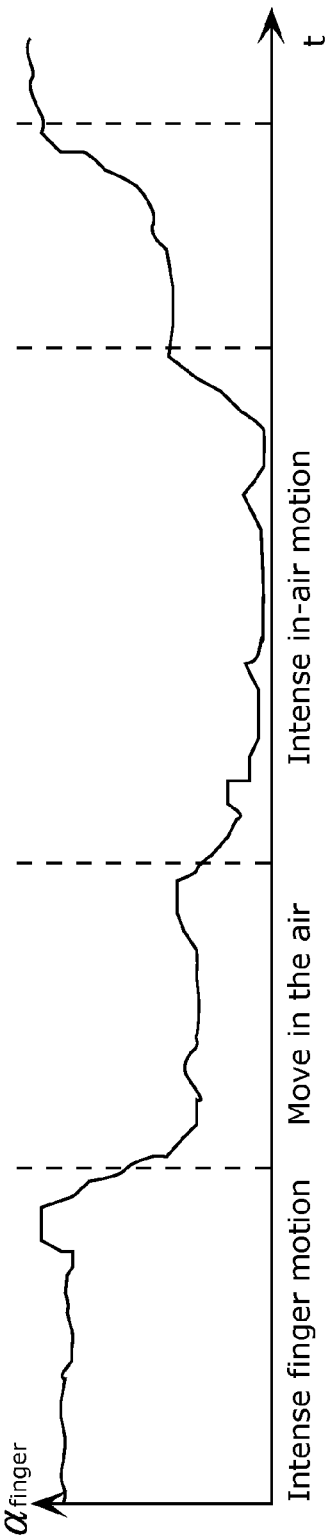
FIG. 12B is a graph illustrating the change in a sensitivity parameter $\alpha_{finger}$ with regard to a user's motion.

FIG. 12A is a graph illustrating the change in the sensitivity parameter $\alpha_{hand}$ with regard to the user motion, and FIG. 12B is a graph illustrating the change in the sensitivity parameter $\alpha_{finger}$ with regard to the user motion. In FIG. 12A, the example begins with intense hand motion followed by the user's finger being placed on the touchpad, which is then followed by intense finger motion. As illustrated in FIG. 12B, the example begins with intense finger action, followed by movement in the air and then followed by intense in-air motion. As can be seen, the sensitivity parameter for the hand $\alpha_{hand}$ is high when the user is only performing in-air motion and the sensitivity parameter for the hand $\alpha_{hand}$ is lower when the user is performing intense finger motion. Conversely, the sensitivity parameter for the finger $\alpha_{finger}$ is high when the user is not performing any in-air motion and the sensitivity parameter for the finger $\alpha_{finger}$ is lower when the user is performing intense in-air motion. As described above, by the sensitivity parameter α(t), the user movement of the first type and the user movement of the second type cross-pollinate each other, and are combined in a collaborative manner.

Accordingly, the graphic cursor on the display is represented with highly accurate and stable movement.

Here, the change in the size of the cursor $C_{diameter}$ depending on the user movement shall be described.

Figure 13:
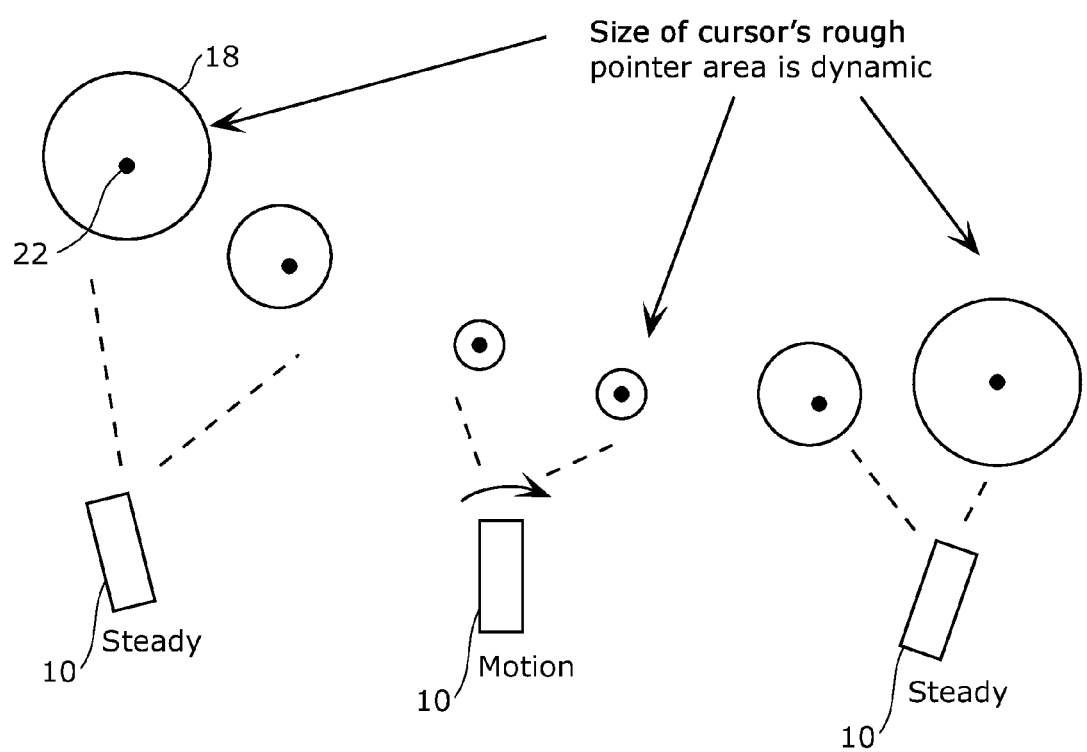
FIG. 13 is a first diagram illustrating dynamic change in the size of cursor.

FIG. 13 is the first diagram illustrating the dynamic change in the size of cursor and behavior of the rough pointer region. FIG. 13 illustrates how the size of the rough pointer region dynamically changes based on motion. The rough pointer region 18 is small when the user is performing intense in-air motion, that is, when the user's movement of the first type is large, and becomes larger when the user's hand is steady in the air, that is, when the user's hand is not moving in the air and thus the user's movement of the first type is small. More specifically, the larger the sensitivity parameter α is, or the smaller the sensitivity parameter $\alpha_{finger}$ is, the smaller the rough pointer region 18 which is the first cursor. With this, an accurate cursor display is achieved in each movement mode.

Figure 14:
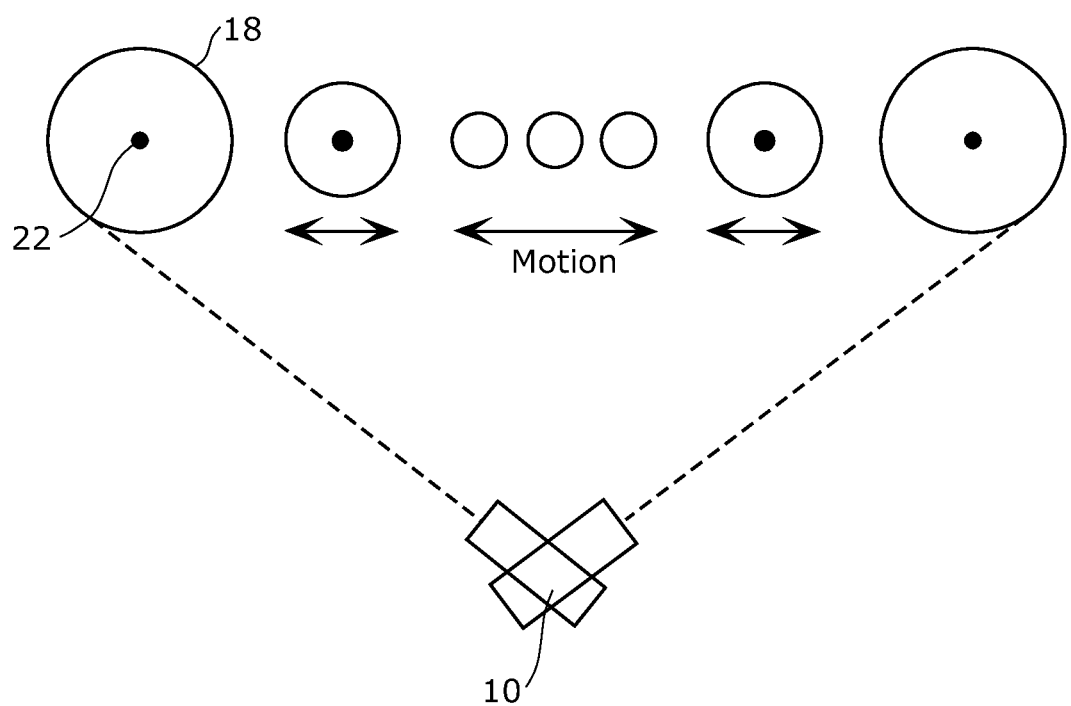
FIG. 14 is a second diagram illustrating dynamic change in the displayed cursor.

FIG. 14 is the second diagram illustrating the dynamic change in the size of cursor. As illustrated in FIG. 14, for example, when the user is performing an intense in-air motion and not touching the touchpad, the precise pointer 22 is not displayed. The processing is denoted as the following expression 12 and expression 13.

$$\text{if } C_{diameter}<C\text{th,the fine pointer }\mathbf{22}\text{ is not displayed} \qquad \text{(Expression 12)}$$

$$\text{if } C_{diameter}>C\text{th,the fine pointer }\mathbf{22}\text{ is displayed} \qquad \text{(Expression 13)}$$

Here, Cth denotes a threshold with regard to the size of the cursor in the rough pointer region 18, and is collaborative with the behavior of the rough pointer region illustrated in FIG. 13. Accordingly, when the user is performing an intense in-air motion, the precise pointer is gone, and the user can focus only on the rough pointer. To put it differently, appropriate cursor display is achieved in each movement mode. Accordingly, it is possible to reduce the load on the user for recognizing the cursor, improving the operability.

Note that, not only the size of the cursor indicating the size of the rough pointer region 18, but also the color and shape of the rough pointer region 18 and the precise pointer 22 may be changed. For example, a threshold representing the amount or speed of the movement of the rough pointer region 18 is set, and when the value is greater than or equal to the threshold, the rough pointer region 18 is made triangular shape and black in display, and when the value is smaller than the threshold, the rough pointer region 18 is made circular shape and red in display.

Figure 15:
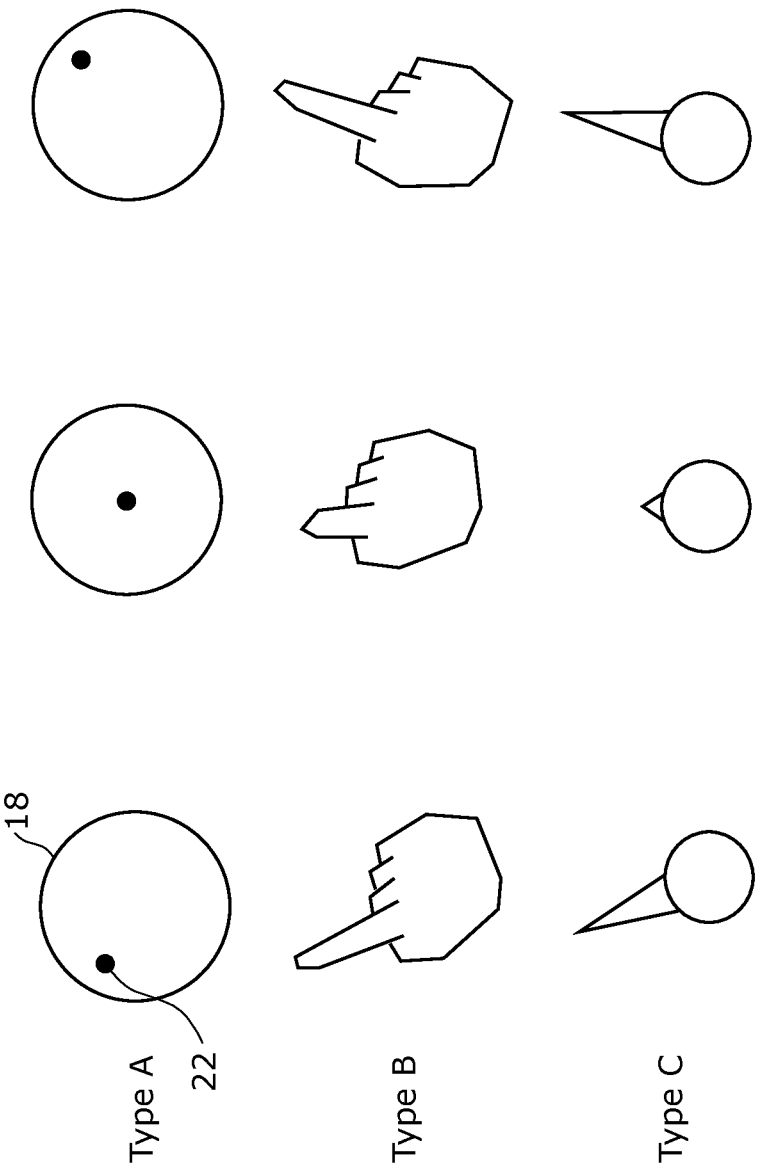
FIG. 15 illustrates variations in the cursor display.

FIG. 15 illustrates variations in the cursor display. In this embodiment, as in the type A in FIG. 15, the rough pointer region 18 is displayed as a circle, and the fine pointer 22 is displayed as a dot. However, depending on an application, the cursors may be displayed as in the type B and the type C. In type B, the size of the hand represents the size of the rough pointer region 18, and the tip of the index finger represents the position of the precise pointer 22. Furthermore, in type C, the size of the circle represents the size of the rough pointer region 18, and the tip of the triangle represents the position of the precise pointer 22. With this display, the cursor display appropriate for the application is implemented. Accordingly, the load on the user for recognizing the cursor can be reduced, thereby improving the operability.

The foregoing description of the embodiments and variations has been provided for purposes of illustration and description. It is not intended to be exhaustive or to limit the disclosure. Individual elements or features of a particular embodiment and its variation are generally not limited to that particular embodiment and its variation, but, where applicable, are interchangeable and can be used in a selected embodiment and its variation, even if not specifically shown or described. The same may also be varied in many ways. Such variations are not to be regarded as a departure from the disclosure, and all such modifications are intended to be included within the scope of the disclosure.

INDUSTRIAL APPLICABILITY

The information input apparatus and method for controlling the information input apparatus according to the present disclosure are applicable to a GUI system used by computers or many consumer electronics products.

REFERENCE SIGNS LIST

10 Handheld controller
12 Cursor
14 Display
15 Consumer electronics product
16 Touchpad
18 Rough pointer region
20 Center
22 Precise pointer
24, 26c, 80 Processor
24c, 26 Memory
28 Input-output (I/O) interface circuitry
30, 30c, Wireless transceiver
32 Buttons array
34 Touchpad driver
36 Accelerometer
37 Magnetometer
38 Gyroscope
40 Device
44 Field region
46 Computer
48 Speaker
50 Motion data
52 Touchpad data
54 Hybrid pointing/selection method
56 Application
60 First positional range
62 First selection range
64 Second positional range
66 Second selection range
68 Third positional range
70 Point
72 Third selection range
73 Hand motion intention calculation processor
74 Finger motion intention calculation processor
76 Rough pointer movement processor
78 Precise pointer movement processor
82 Rough pointer region appearance processor
91 Joystick
92 Trackball
102, 106, 110, 114, 116, 118, 120, 200, 202, 204, 206 Storage area

The invention claimed is:

1. An information input apparatus for a user to control a graphic cursor displayed on a display, the information input apparatus comprising:
a first sensor responsive to user movement of a first type producing first sensor data, the user movement of the first type being motion of a part of a body of the user;
a second sensor responsive to user movement of a second type more precise than the first type producing second sensor data, the user movement of the second type being motion of a part of the body of the user; and
at least one processor that calculates a hybrid cursor movement signal having a large scale movement component corresponding to the user movement of the first type and a fine scale movement component corresponding to the user movement of the second type and representing movement in a finer scale than the large scale movement component, the hybrid cursor movement signal being for moving the graphic cursor;
wherein the graphic cursor includes at least a first cursor and a second cursor smaller than the first cursor and positioned in the first cursor,
wherein the at least one processor calculates the large scale movement component based on a first sensitivity parameter representing sensitivity of the first sensor with respect to the user movement of the first type, and determined by associating the second sensor data with the first sensor data,
wherein the at least one processor calculates the fine scale movement component based on a second sensitivity parameter representing sensitivity of the second sensor with respect to the user movement of the second type, determined by associating the first sensor data with the second sensor data, and
wherein the at least one processor monitors increases and decreases in the first and second sensitivity parameters and reduces the size of the first cursor in proportion to an increase in the first sensitivity parameter and in proportion to a decrease in the second sensitivity parameter.

2. The information input apparatus according to claim 1, wherein when both the user movement of the first type and the user movement of the second type are performed, the at least one processor suppresses the large scale movement component by setting the first sensitivity parameter to be smaller for a more intense user movement of the second type, and suppresses the fine scale movement component by setting the second sensitivity parameter to be smaller for a more intense user movement of the first type.

3. The information input apparatus according to claim 2, wherein the graphic cursor includes at least a first cursor and a second cursor smaller than the first cursor and positioned in the first cursor, and
the large scale movement component is a signal component for moving the first cursor and the second cursor, and the fine scale movement component is a signal component for moving the second cursor.

4. The information input apparatus according to claim 1, wherein the first sensor is a sensor sensing motion of a hand or arm.

5. The information input apparatus according to claim 1, wherein the second sensor is a sensor sensing motion of a finger or thumb.

6. The information input apparatus according to claim 1, further comprising
a transmitter for wireless communication between the at least one processor and a display driver for displaying the graphic cursor on the display.

7. The information input apparatus according to claim 1, comprising
n sensors including: a k-th sensor responsive to user movement of a k-th type producing k-th sensor data, the user movement of the k-th type being motion of a part of the body of the user; and a (k+1)-th sensor responsive to user movement of a (k+1)-th type more precise than the k-th type producing (k+1)-th sensor data, the user movement of the (k+1)-th type being motion of a part of the body of the user, where $1 \leq k < n$ is satisfied, wherein the at least one processor (i) calculates a hybrid cursor movement signal having a movement component corresponding to the user movement of the k-th type and a movement component corresponding to the user movement of the (k+1)-th type, (ii) sets a k-th cursor area corresponding to the k-th sensor data, using data obtained by combining the k-th sensor data and other sensor data, and (iii) sets a (k+1)-th cursor area in the k-th cursor area, corresponding to the (k+1)-th sensor data, using data obtained by combining the (k+1)-th cursor data and other sensor data.

8. A handheld controller for a user to control a graphic cursor displayed on a display, the handheld controller comprising:
- an in-air motion sensor that produces a first signal indicative of movement of the handheld controller with respect to a first reference frame;
- a touch sensor responsive to contacting motion of a user's finger or thumb that produces a second signal indicative of movement of the user's finger or thumb with respect to a second reference frame associated with a surface area of the touch sensor touched by the user's finger or thumb; and
- at least one processor that calculates cursor size and position data of the graphic cursor,
- wherein the graphic cursor includes at least a first cursor and a second cursor smaller than the first cursor and positioned in the first cursor,
- wherein the at least one processor calculates size and position data of the first cursor corresponding to the movement of the handheld controller and size and position data of the second cursor and corresponding to the contacting motion of the user's finger or thumb, by combining the first signal and the second signal that are weighted according to intensity of the first signal and the second signal, and
- wherein the at least one processor monitors intensity of the first and second signals and reduces the size of the first cursor in response to an increase in intensity of the first signal and in response to a decrease in intensity of the second signal.

9. The handheld controller according to claim 8, wherein the in-air motion sensor is a sensor sensing motion of a hand or arm.

10. The handheld controller according to claim 8, wherein the touch sensor is a sensor sensing motion of a finger or thumb.

11. A method for controlling an information input apparatus for a user to control a graphic cursor displayed on a display, the method comprising:
- producing first sensor data by a first sensor responsive to user movement of a first type, the user movement of the first type being motion of a part of a body of the user;
- producing second sensor data by a second sensor responsive to user movement of a second type more precise than the first type, the user movement of the second type being motion of a part of the body of the user;
- calculating a large scale movement component corresponding to the user movement of the first type, based on a first sensitivity parameter representing sensitivity of the first sensor with respect to the user movement of the first type, determined by associating the second sensor data with the first sensor data;
- calculating a fine scale movement component corresponding to the user movement of the second type and representing movement in a finer scale than the large scale movement component, based on a second sensitivity parameter representing sensitivity of the second sensor with respect to the user movement of the second type, and determined by associating the first sensor data with the second sensor data;
- calculating a hybrid cursor movement signal for moving the graphic cursor by combining the large scale movement component and the fine scale movement component,
- defining the graphic cursor to include at least a first cursor and a second cursor smaller than the first cursor and positioned in the first cursor, and
- monitoring increases and decreases in the first and second sensitivity parameters and reducing the size of the first cursor in proportion to an increase in the first sensitivity parameter and in proportion to a decrease in the second sensitivity parameter.

12. The method for controlling the information input apparatus according to claim 11, wherein, in calculating the large scale movement component and the fine scale movement component, when both the user movement of the first type and the user movement of the second type are performed, the large scale movement component is suppressed by setting the first sensitivity parameter to be smaller for a more intense user movement of the second type, and the fine scale movement component is suppressed by setting the second sensitivity parameter to be smaller for a more intense user movement of the first type.

* * * * *